No. 738,311. PATENTED SEPT. 8, 1903.
W. T. FOX.
TUBULAR BOILER.
APPLICATION FILED APR. 28, 1902.
NO MODEL. 2 SHEETS—SHEET 1.

Witnesses.
Walter B. Payne.
G. Willard Rich.

Inventor.
William T. Fox
by Frederick S. Church
his Attorney

No. 738,311. PATENTED SEPT. 8, 1903.
W. T. FOX.
TUBULAR BOILER.
APPLICATION FILED APR. 28, 1902.
NO MODEL. 2 SHEETS—SHEET 2.

Witnesses.
Walter B. Payne
G. Willard Rich

Inventor.
William T. Fox
by Frederick S. Church
his Attorney

No. 738,311. Patented September 8, 1903.

UNITED STATES PATENT OFFICE.

WILLIAM T. FOX, OF ROCHESTER, NEW YORK.

TUBULAR BOILER.

SPECIFICATION forming part of Letters Patent No. 738,311, dated September 8, 1903.

Application filed April 28, 1902. Serial No. 104,930. (No model.)

*To all whom it may concern:*

Be it known that I, WILLIAM T. FOX, of Rochester, in the county of Monroe and State of New York, have invented certain new and useful Improvements in Tubular Boilers; and I do hereby declare the following to be a full, clear, and exact description of the same, reference being had to the accompanying drawings, forming a part of this specification, and to the reference-numerals marked thereon.

My present invention relates to steam-generators, and particularly to that class known as "tubular" boilers for the production of steam from water or other liquid; and it has for its object to provide for a generator that shall be light in weight, compact, and so constructed that a large heating-surface is obtained and the rapid circulation of the liquid in contact therewith is permitted.

My invention has for its further object to provide a construction whereby the separate tubes or circulating-pipes may be easily removed and replaced or new ones applied, if for any reason it is so desired.

To these and other ends my invention consists in certain improvements in construction and combination of parts, all as will be hereinafter fully described, the novel features being pointed out in the claims at the end of this specification.

Figure 1:
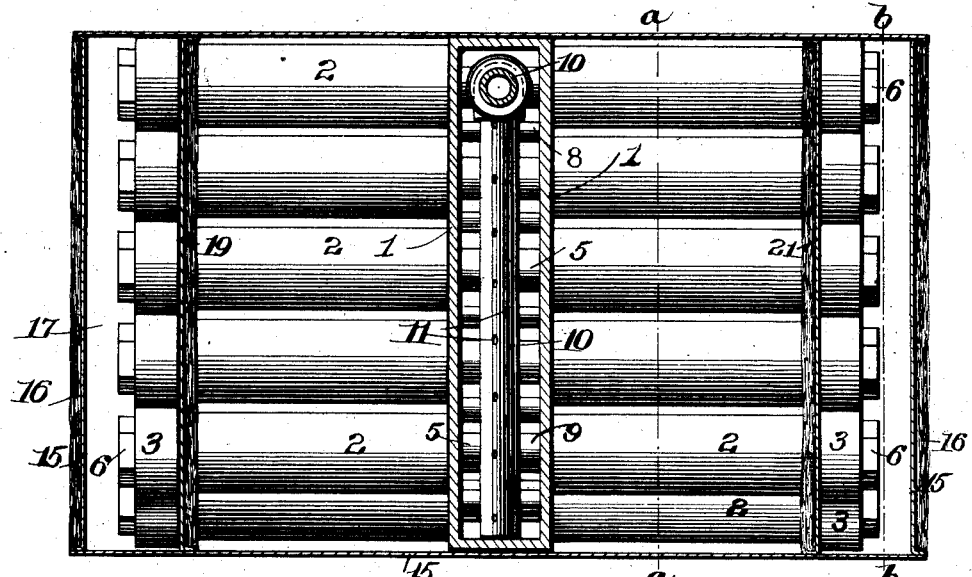
Figure 2:
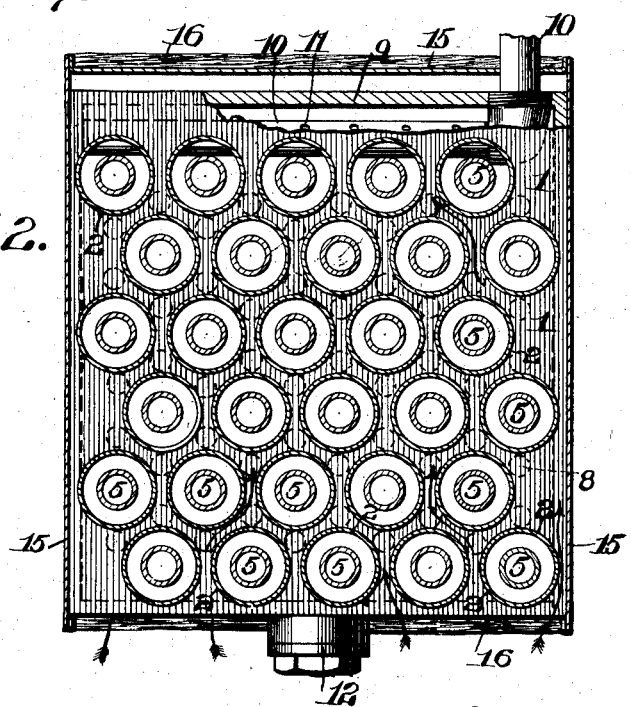
Figure 4:
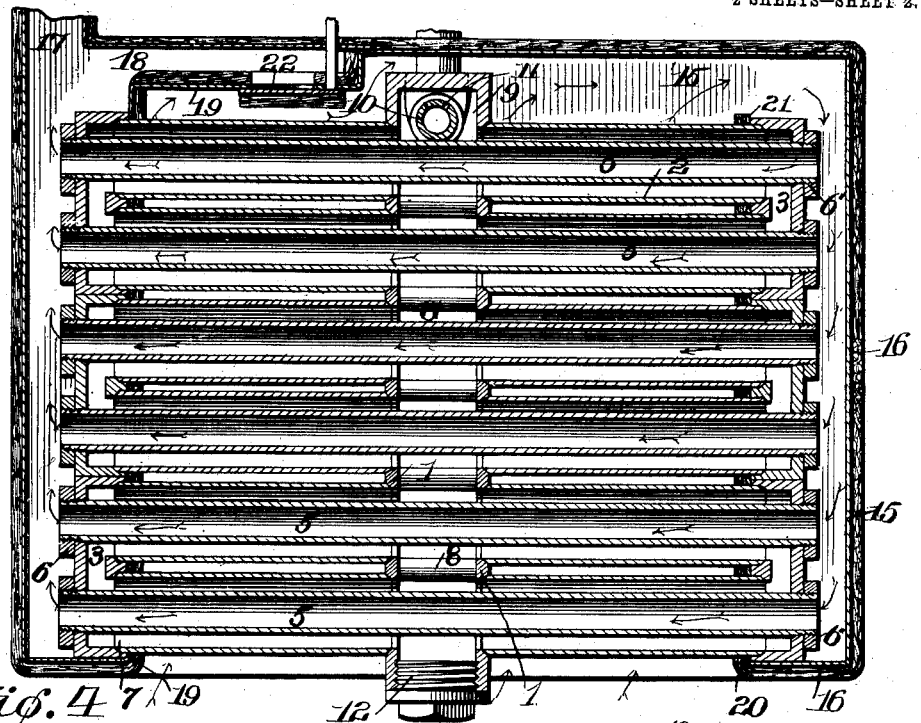
Figure 3:
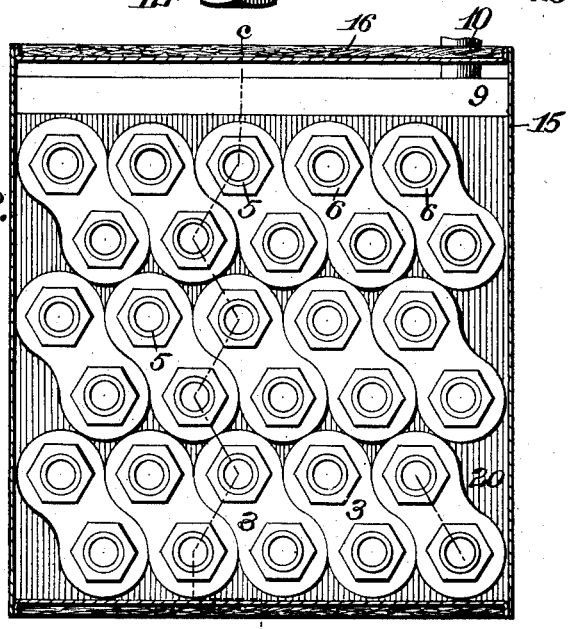

In the drawings, Figure 1 is a top plan view of a generator constructed in accordance with my invention shown with the upper portion of the casing removed. Fig. 2 is a cross-sectional view thereof on the line *a a* of Fig. 1. Fig. 3 is an end view on the line *b b* of Fig. 1, and Fig. 4 is a longitudinal sectional view of the generator on the line *c c* of Fig. 3.

Similar reference-numerals in the several figures indicate similar parts.

A generator or steam-boiler constructed in accordance with my invention embodies a hollow chamber or casing substantially rectangular in form, having the parallel sides 1, from which are laterally-extending tubes 2, communicating at their inner ends with the hollow chamber and at their outer end connected with the ends of adjacent tubes by hollow cap-plates or heads 3, as will be further described. The corresponding tubes 2 at each side of the chamber form a pair which are in alinement, and extending centrally through them are the flues 5, the threaded ends of which project beyond the cap-plates or heads 3 and are provided with nuts 6, by means of which the caps may be compressed against the ends of the tubes and the latter held rigidly in position against the sides 1 of the casing, in which capacity the flues form staybolts or hollow stay members. As the water-tubes 2 are thus held rigidly, tight connections may be easily formed by slightly tapering the parts of the joints formed by the ends of the tubes and the edges of the apertures in the casing and cap-plate, as indicated by 7, and, if necessary, these coöperating parts may be ground to form a very accurate fit. In order that the compressional force upon the series of tubes at each side of the casing may not spring or buckle the parallel sides 1, I arrange between the latter at desired points small stays or braces 8. The upper end of the central chamber is extended above the water-tubes to form a steam-dome 9, and arranged therein is a pipe 10, leading to the engine or other receiver at the exterior of the generator or boiler. The inner end of the steam-pipe is closed, and the upper portion inclosed in the chamber is provided with a series of small apertures or perforations 11, through which the steam passes from the generator into the pipe and is conducted to the engine or elsewhere. This arrangement of the pipe permits the steam to be taken equally from different portions of the dome.

12 indicates a washout-plug at the bottom of the central chamber, which may be removed when it is desired to remove sediment or deposits from the interior of the boiler.

The generator or boiler is inclosed in a casing 15, extending over the ends, sides, and top thereof, and which may be provided upon the exterior with non-conducting material 16, such as asbestos fiber. Above the casing and preferably at one side thereof is arranged a chimney or exit-passage 17, and leading therefrom is a passage 18, communicating with the interior of the casing at a point intermediate the ends of the tubes 2, and the space between the latter at the end adjacent the passage 17 is closed by a plate or partition 19, which joins the interior of the casing 15. A plate 20 is similarly arranged between the tubes at the opposite end of the generator;

but the upper edge 21 thereof is out of contact with the top of the casing, forming a passage through which the products of combustion may pass to this end of the generator and thence through the flues 5 to the other end of the generator, to be finally emitted from the chimney or passage 17. The passage 18, leading from the latter to the casing between the partitions or plates 19 and 20, is normally closed by a damper 22, having a handle 23, by means of which it may be operated if, for instance, it is desired to allow the products of combustion to pass directly to the chimney, as when the fire beneath the generator is first started or when it is desired to produce steam less rapidly by only heating the exterior of the water-tubes, thus reducing the heating-surface which is otherwise increased by the area of the flues 5. The spaces between the tubes and the exterior casing may be inclosed at the ends in any suitable manner; but for convenience I prefer to employ the plates 19 and 20, which may be apertured to slip over the tubes, as shown, and secured in position by the heads or hollow cap-plates 3. The generator or boiler may be employed in connection with any furnace or gas-heating apparatus arranged beneath it, and the heated gases or products of combustion therefrom first passing between the plates or partitions 19 and 20 will contact with the exterior of the tubes 2 and after passing over the top of the latter partitions will heat the interior of the flues 5, and the somewhat circuitous route for said products will enable the gases thereof to be completely consumed before passing out to the chimney.

The arrangement of the parts as I have shown them is advantageous in that while the heating-surface is very greatly increased I am also enabled by extending the flues longitudinally through the water-tubes to subdivide the body of the liquid in such a manner that it is caused to circulate very rapidly in contact with heated surfaces. As the boiler need not necessarily be filled with liquid, the tubes and flues at the top of the boiler will serve to superheat and dry the steam as it passes to the dome.

Steam-generators such as I have described are light in weight, simple and inexpensive in construction, and are capable of being employed in any capacity in which the rapid production of steam at a minimum expenditure of heat is desired, and by employing the construction I have shown any of the water-tubes may be easily removed by disengaging the nuts 6 upon the ends of the respective flues, when a new tube may be inserted without disturbing the remainder.

I claim as my invention—

1. In a tubular boiler, the combination with the tubes, the heads arranged at the ends of the latter, and forming a passage between the heads, and the flues extending through the tubes and heads, of a casing forming a passage leading from the former passage to one end of the flues and a separate passage at the opposite end thereof, and an intermediate passage connecting the latter with the passage between the heads.

2. In a tubular boiler, the combination with a series of connected tubes, and flues extending through the latter, of partitions forming a passage inclosing the tubes, a casing forming a passage leading from the latter passage to one end of the flues, and forming at the opposite end an outlet-passage, a connecting-passage between the latter and the passage between the partitions, and a damper controlling said passage whereby the products of combustion may be directed through the flues before entering the outlet-passage.

3. In a tubular boiler, the combination with a casing having the sides, water-tubes projecting therefrom, those upon the opposite sides of the casing being arranged in pairs, and hollow cap-plates at the outer ends of said tubes connecting them with the ends of a similar pair of tubes, of a stay member arranged in each pair of tubes and engaging the caps on the ends thereof.

4. In a tubular boiler, the combination with a casing having the sides, and a plurality of tubes extending therefrom and communicating with the interior thereof, of stay members passing through the corresponding tubes at each side of the casing, and engaging devices between the members and the tubes.

5. In a tubular boiler, the combination with a hollow casing having the sides, and water-tubes having the closed ends and extending on each side of the casing, of a tubular stay member extending longitudinally of the tubes and projecting through the ends thereof, and means on the member for holding the tubes in contact with the sides of the casing.

6. In a tubular boiler, the combination with a hollow casing having the sides, and a water-tube extending in alinement on each side of the casing having the closed outer ends, of a tubular stay member extending through the tubes, and means for securing the stay member to the ends of the tubes to provide a longitudinally-extending passage through said tubes.

7. In a tubular boiler, the combination with a hollow casing having the apertured sides, water-tubes having the tapered inner and outer ends the former engaging the edge of the aperture in the casing, and hollow cap-plates at the opposite ends of said tubes connecting them with a similar pair of tubes, of stay members, and adjustable devices thereon engaging the cap-plates to move them relatively whereby they are secured to the tubes and the inner ends of the latter are compressed into engagement with the casing.

8. In a tubular boiler, the combination with a hollow casing having the apertured sides, water-tubes having the ends abutting the casing around the apertures, said tubes projecting on opposite sides of the casing being arranged in pairs, and cap-plates having passages therein connecting a plurality of tubes at their outer ends, and flues extending through the tubes having the threaded ends and provided with the nuts engaging the cap-plates.

9. In a tubular boiler, the combination with a hollow casing having the apertured sides and the braces between the latter, of water-tubes extending outwardly from the sides of the casing, and stay members adjustably engaging the tubes to move them relatively into engagement with the opposite sides of the casing.

WILLIAM T. FOX.

Witnesses:
G. WILLARD RICH,
WALTER B. PAYNE.